US011516885B2

(12) United States Patent
Walz et al.

(10) Patent No.: US 11,516,885 B2
(45) Date of Patent: Nov. 29, 2022

(54) ELECTRIC HEATING DEVICE AND METHOD FOR ITS PRODUCTION

(71) Applicant: Eberspächer catem GmbH & Co. KG, Herxheim (DE)

(72) Inventors: Kurt Walz, Hagenbach (DE); Michael Niederer, Kapellen-Drusweiler (DE)

(73) Assignee: Eberspächer catem GmbH & Co. KG, Herxheim (DE)

( * ) Notice: Subject to any disclaimer, the term of this patent is extended or adjusted under 35 U.S.C. 154(b) by 0 days.

(21) Appl. No.: 17/183,940

(22) Filed: Feb. 24, 2021

(65) Prior Publication Data

US 2021/0267016 A1 Aug. 26, 2021

(30) Foreign Application Priority Data

Feb. 26, 2020 (DE) ..................... 10 2020 202 453.7

(51) Int. Cl.

*H05B 3/04* (2006.01)
*H05B 3/06* (2006.01)
*B60H 1/22* (2006.01)
*H05B 1/02* (2006.01)

(52) U.S. Cl.

CPC ............ *H05B 1/0288* (2013.01); *H05B 3/04* (2013.01); *H05B 3/06* (2013.01); *H05B 2203/017* (2013.01); *H05B 2203/02* (2013.01); *H05B 2203/021* (2013.01)

(58) Field of Classification Search

None
See application file for complete search history.

(56) References Cited

U.S. PATENT DOCUMENTS

2018/0160480 A1* 6/2018 Bohlender ............ F24H 9/1872
2020/0275529 A1* 8/2020 Walz ........................ H05B 3/06
2020/0286653 A1* 9/2020 Feustel .................. H05B 3/141
2020/0314965 A1* 10/2020 Walz ...................... H05B 3/265
2020/0340708 A1* 10/2020 Walz ....................... F24H 1/009
2021/0045194 A1* 2/2021 Hort ..................... H05B 1/0294
2022/0053610 A1* 2/2022 Klingebiel ............... H05B 3/24

FOREIGN PATENT DOCUMENTS

DE 10258257 7/2003
DE 2 607 121 6/2013
DE 102017221490 6/2019
DE 20 2019 005223 2/2020
EP 1872986 1/2008

(Continued)

*Primary Examiner* — Joseph M. Pelham
(74) *Attorney, Agent, or Firm* — Boyle Fredrickson S.C.

(57) ABSTRACT

An electric heating device comprises a housing with a partition wall which separates a connection chamber from a heating chamber for dissipating heat and from which at least one PTC heating element with a heater casing protrudes in the direction toward the heating chamber. The at least one PTC element and conductor tracks are supported in the heater casing in an insulated manner. The heater casing is sealed against the partition wall by way of a seal arranged in a receptacle of the partition wall circumferentially surrounding the heater casing. A press ring is arranged in the receptacle and surrounds the heater casing circumferentially, securing the seal in the receptacle. A method of forming such an electric heating device also is disclosed.

8 Claims, 3 Drawing Sheets

(56) References Cited

FOREIGN PATENT DOCUMENTS

| | | |
|---|---|---|
| EP | 2337425 | 6/2011 |
| EP | 2796804 | 10/2014 |
| EP | 3 101 365 | 12/2016 |
| EP | 3334242 | 1/2020 |
| EP | 3772867 | 2/2021 |

* cited by examiner

ELECTRIC HEATING DEVICE AND METHOD FOR ITS PRODUCTION

BACKGROUND OF THE INVENTION

1. Field of the Invention

The present invention relates to an electric heating device with a housing comprising a partition wall which separates a connection chamber from a heating chamber for dissipating heat. At least one PTC heating device protrudes from the partition wall in the direction toward the heating chamber. This PTC heating element is exposed in the heating chamber in the manner of a heating rib. The PTC heating element has at least one PTC element and conductor tracks connected thereto in an electrically conductive manner which are associated with different polarities for energizing the PTC element. These conductor tracks are electrically connected to the power current in the connection chamber.

2. Background of the Invention

Such an electric heating device is known, for example, from EP 1 872 986 A1 or EP 2 337 425 A1. Another also generic electric heating device is known from EP 3 334 242 A1. In this prior art, the PTC heating element is first manufactured as a separate component and inserted as such into a heating element receptacle formed on the partition wall, so that the end of the heating element casing on the connection side is accommodated in a sealed manner in the heating element receptacle of the partition wall and the conductor tracks with their free ends on the connection side are exposed in the connection chamber in order to be electrically connected there.

In the prior art previously mentioned, the PTC heating element thus preassembled is held frictionally engaged in the heating element receptacle. For this purpose, the PTC heating element has a labyrinth seal that is formed by the heating element casing and that is pressed into the heating element receptacle.

According to the teaching of EP 3 334 242 A1, the attachment of the PTC heating element is to be suitable at least for the assembly of the individual components of the previously known electric heating device. After all components of the electric heating device have been installed, the PTC heating element on its underside opposite to the connection side is supported on a base which, in the example discussed above, closes off the heating chamber. The PTC heating element is then clamped between the base and the heating element receptacle and secured in its installed position.

SUMMARY

The present invention is based on the problem of specifying an electric heating device which is improved in terms of sealing the PTC heating device as well as a method for producing such a heating device.

To satisfy the object in terms of the device, the present invention specifies an electric heating device including a housing having a partition wall which separates a connection chamber from a heating chamber for dissipating heat and from which at least one PTC heating element with a heater casing protrudes toward the heating chamber. At least one PTC element and conductor tracks are supported in the heater casing, the conductor tracks being electrically connected to the PTC element in the connection chamber and are configured to energize the PTC element with different polarities. The heater casing is sealed from the receptacle with a seal, as is known per se from prior art. The seal completely surrounds the heater casing circumferentially. The receptacle then forms a female plug element of a mechanical coupling of the heater casing together with the seal. The seal can be connected to the heater casing in a manner known per se prior to the heater casing being mounted on the partition wall, it can in particular be connected to the heater casing in a positive substance-fit manner by injection molding elastomeric plastic material. Alternatively, the seal can also be produced separately and inserted in a positive-fit manner into a seal receptacle formed on the heater casing.

The seal is made of resiliently soft plastic material, typically an elastomer; the seal may be made of silicone.

According to the present invention, a press ring is arranged in the receptacle and surrounds the heater casing circumferentially, securing the seal in the receptacle. The press ring is pressed into the receptacle and thereby pressed between the heater casing and a wall of the partition wall defining the receptacle. The press ring can be held in a positive-fit and/or force-fit manner. The press ring then accomplishes securing the heater casing in the receptacle and prevents the seal from detaching from the receptacle.

Ideally, both the heater casing as well as the seal are secured in the receptacle with the press ring. For this purpose, the press ring can be disposed between the seal and the heating chamber and accordingly prevent the seal from slipping out of the receptacle in the direction toward the heating chamber. Alternatively, the seal can also be formed with the press ring as a unitary component. In this case, the press ring is embedded into the material of the seal during the production of the seal. In the direction of insertion of the heater casing into the receptacle, the region of the press ring can be provided at the rear end of this unit of the press ring and the seal, whereas the elastomeric material of the seal without an inserted press ring is provided at the front end and causes the sealing effect alone.

The press ring can have a metallic structure. The press ring may be configured to be electrically conductive. In this case, the press ring abuts in an electrically conductive manner against the outer circumferential surface of the heater casing and the inner circumferential surface of the receptacle. The shielding formed by the heater casing around the PTC element and the contact plates is thereby connected in an electrically conductive manner to a shielding that includes the partition wall and shields control components within the connection chamber. The heater casing is accordingly electrically connected via the press ring to a ground terminal of the housing which is used to shield the electric heating device as a whole. The ground terminal is exposed on the outer side of the electric heating device for the connection of a ground cable. It is typically a bolt that is connected in an electrically conductive manner to part of the heater casing, in particular that part which circumferentially surrounds the connection chamber.

The press ring also creates improved heat conduction between the heater casing and the housing. In the region of the receptacle, the heat from the heater casing is accordingly dissipated in an improved manner directly to the housing, which in this respect can make a greater contribution to heat extraction than in prior art. The thermal introduction into control electronics that are separated by the partition wall and placed on the other side of the receptacle is also reduced.

The press ring may be secured in the receptacle by caulking the housing. For this purpose, the regions surrounding the receptacle and being formed by the housing are caulked so that the initially cylindrical walls of the receptacle extending in the direction of insertion of the heater casing are deformed inwardly at their free end so that they project over the press ring and/or the seal. During the caulking process, the partition wall in the wall of the receptacle is accordingly plastically deformed. The plastic deformation can be cold deformation, in particular in the event that the partition wall is made of metallic material. The deformation can also be hot deformation. This procedure is particularly beneficial in the case of a partition wall made of plastic material. The temperature respectively at work simplifies the plastic deformation of the plastic material.

To complete the shielding, a connection pin is typically provided in the region of the receptacle in such a configuration and is in electrical contact with the press ring after assembly in order to electrically connect the shielding around the PTC element caused by the heater casing to a shielding of the electric heating device. This shielding can be formed, for example, by a shielding housing inserted into the connection chamber or a metallic connection or control housing surrounding the connection chamber.

According to a preferred development of the present invention, the press ring may comprise several contact projections which project from former's outer circumferential surface and typically extend in the direction of insertion. These projections claw into the inner circumferential surface of the wall of the receptacle and cause a reliable connection between the press ring and the receptacle.

The press ring arranged in the receptacle improves the retention of the seal and accordingly improves the seal between the heater casing and the partition wall. This reliably prevents a fluid disposed in the region of the heating chamber from entering the connection chamber. This results in increased electrical safety, in particular when operating the electric heating device with high voltage, for example, in an electrically operated motor vehicle. The field of application of the electric heating device is in particular the field of automotive technology. An electric heating device installed in a motor vehicle is subject to considerable vibrations. Due to the additional securing of the seal in the receptacle with the press ring, the electric heating device is configured to a higher degree of vibration resistance.

For satisfying the object of the method, the present invention proposes a method of forming an electric heating device of the type generally described above. The method includes introducing the PTC heating device into a receptacle of the partition wall such that the PTC heating device protrudes from the partition wall in a direction toward the heating chamber, and introducing a press ring into the receptacle and securing the press ring in position in the receptacle.

BRIEF DESCRIPTION OF THE DRAWINGS

Further details and advantages of the present invention shall become apparent from the following description of an embodiment in combination with the drawing, in which.

DETAILED DESCRIPTION

Figure 1:
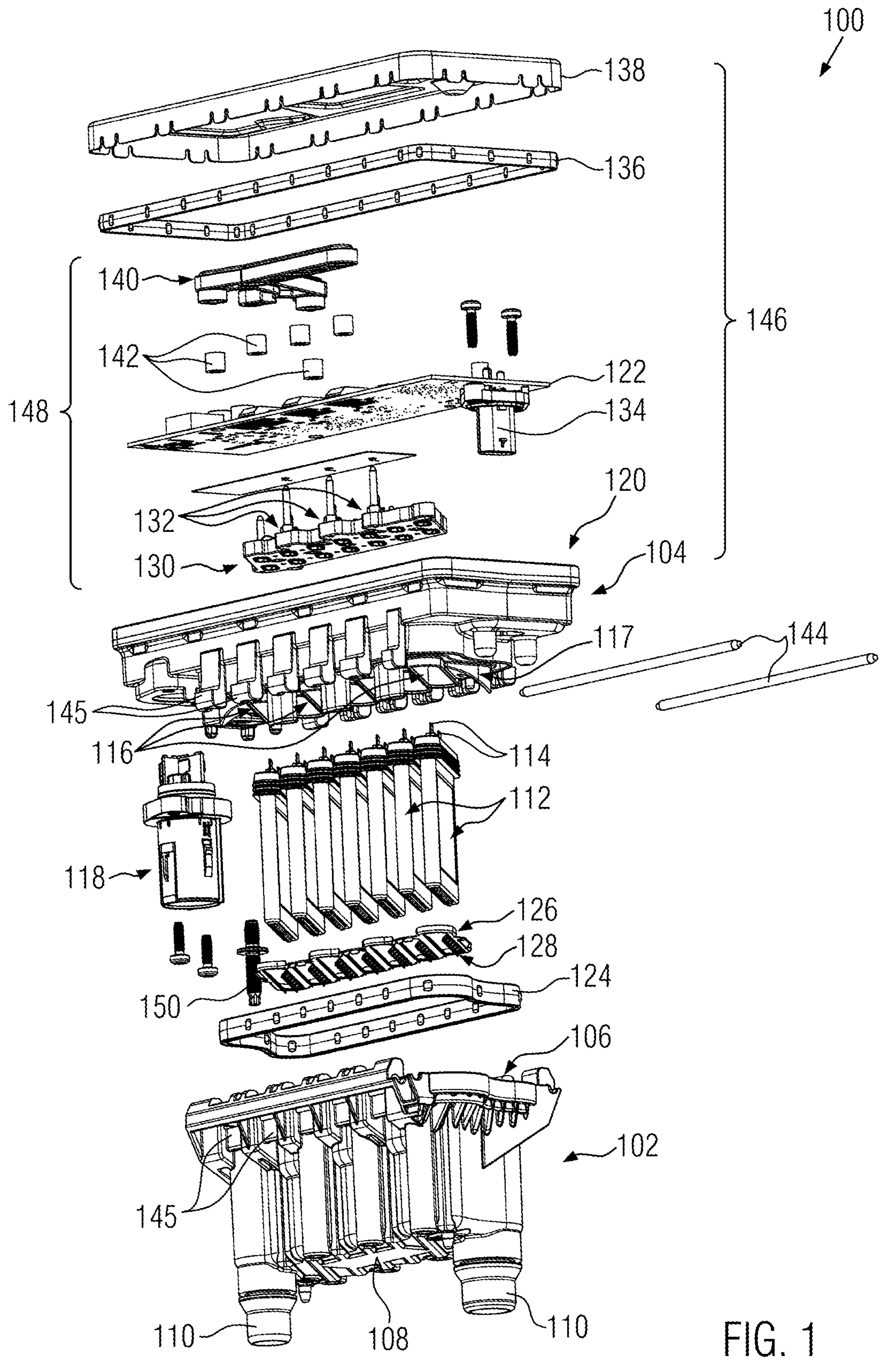
FIG. 1 shows a perspective explosion view of the embodiment of an electric heating device.

FIG. 1 shows an embodiment of an electric heating device 100 with a multi-part housing which comprises a housing lower part 102 made of plastic material and a housing upper part 104 formed integrally from metal by way of die casting.

The housing lower part 102 is trough-shaped and surrounds a heating chamber 106, to which inlet and outlet ports 110 projecting from a base 106 are provided.

Figure 2:
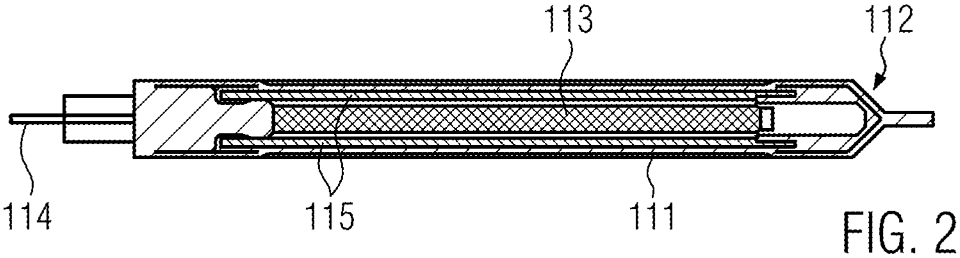
FIG. 2 shows a longitudinal sectional view of the PTC heating device (of the embodiment without a seal.

Illustrated between the housing upper part 104 and the housing lower part 102 in FIG. 1 is a plurality of PTC heating devices 112 which within a heater casing 111 closed circumferentially and at the underside comprise a PTC element 113 and conductor tracks 115, which are electrically contacted with the PTC element 113, cf. FIG. 2. The conductor tracks 115 are electrically connected by way of contact strips 114. The PTC heating devices 112 are held in a plug-contacted manner in receptacles 116 provided for this purpose in a partition wall 117 of the housing upper part 104. Provided in this receptacle 116 is also a seal 119 which circumferentially surrounds the heater casing 111 and is pressed into the receptacle 116.

Details of this configuration are described in EP 3 334 242 A1 which originates from the applicant.

Further elements of the heating device 100 are shown between the housing lower part 102 and the housing upper part 104. A high-voltage plug element is denoted by reference numeral 118 and screwed to the housing lower part 104 and comprises contact elements projecting into a connection chamber 120 of the housing upper part 104. These contact elements are electrically connected to a printed circuit board denoted by reference numeral 12 which can be accommodated in the trough-shaped housing upper part 104. Reference numeral 124 denotes a seal which seals the housing lower part 102 against the housing upper part 104 and therefore the heating chamber 106.

A contacting device 130 is arranged above the housing upper part 104 and below the printed circuit board 122 and electrically connects all the contact strips 114 and groups individual PTC heating devices 112 to form heating circuits. An electrical connection between the contacting device 130 and the printed circuit board 122 is established by way of contact strips 132 projecting from the contacting device 130. Connected to the circuit board 142 and protruding therefrom is a control signal plug element illustrated by reference numeral 134. This control signal plug element 134 is screwed against the circuit board 122.

A further circumferential seal 136 and a control housing cover 138 with which the connection chamber 120 of the housing upper part 104 is covered and sealed are shown above the printed circuit board 122. The control housing cover 138 is made of metal in order to shield together with the housing upper part 104 against electromagnetic radiation which arises from the switching the power current within the control housing 104, 136, 138. A support frame 140 is arranged between the control housing cover 138 and the circuit board 122 and supports compression elements 142 between itself and the circuit board 122 in order to, for example, press power transistors mounted on the circuit board 122 against cooling surfaces which are connected in a thermally conductive manner to cooling domes extended into the heating chamber 106. The cooling surfaces are connected to the power transistors in a thermally conductive manner.

After the assembly, connecting rods 144 engage behind locking projections 145 which are provided on the housing lower part 102 and the housing upper part 104 in order to connect the two parts 102, 104 captively and in a positive-fit manner to one another. Details on this are described in EP 2 796 804 A1.

The control housing cover 138, together with the housing upper part 104 and the seal 136, forms a control housing 146. Due to their metallic materials, the control housing cover 138 and the housing upper part 104 form a shielding around the control device 148 which is accommodated in this control housing 146 and is substantially formed by the printed circuit board 122. A connecting bolt 150 protrudes from the control housing 146 in the direction of the plug elements 118, 134. This connection pin 150 is used to connect the metallic control housing 146 to a ground phase and is screwed to the control housing 146.

Figure 3:
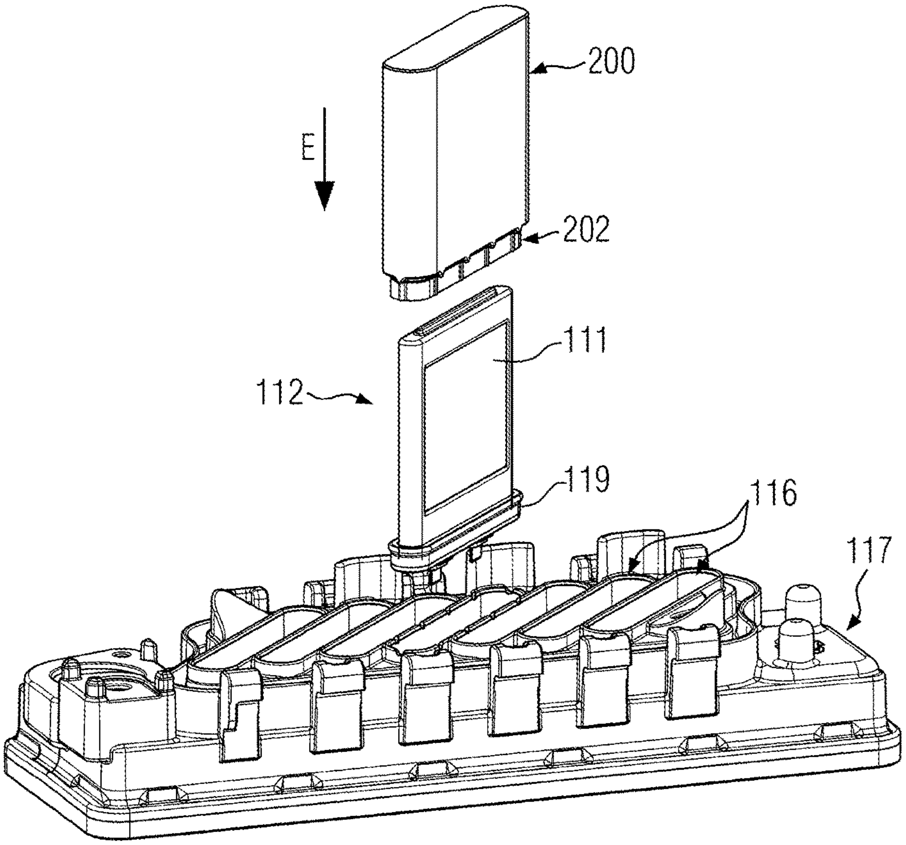
FIG. 3 shows a perspective side view of a detail of the electric heating device before the PTC heating device is joined.

The assembly of the PTC heating device 112 in the receptacle 116 arises in particular from the following description of FIGS. 3 to 8.

Where FIG. 3 shows a side view in an exploded illustration with the housing upper part 104, the partition wall 117 of which forms a plurality of receptacles 116 into which the PTC heating devices 112 are to be inserted. One of the PTC heating devices 112 is shown in FIG. 3 flush with a setting tool 200. The PTC heating device 112 evidently bears the seal 119 which is already mounted on the heater casing 111.

Figure 4:
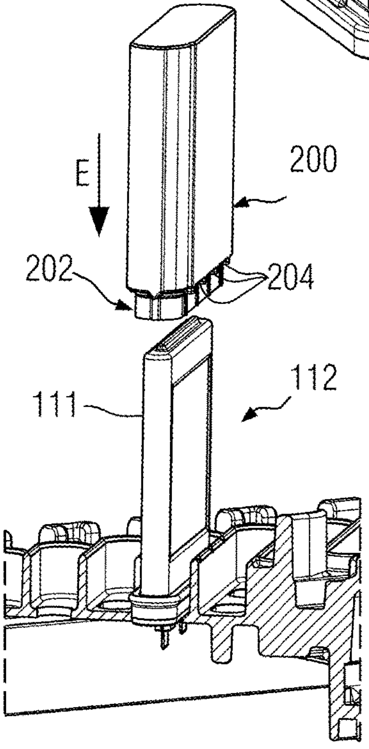
FIG. 4 shows the detail according to FIG. 3 in an enlarged view when the PTC heating device is joined.
Figure 5:
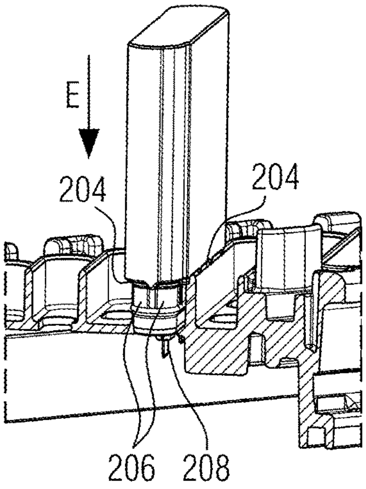
FIG. 5 shows a view according to FIG. 4 at the end of the joining process of the PTC heating device which is still received in the setting tool.
Figure 6:
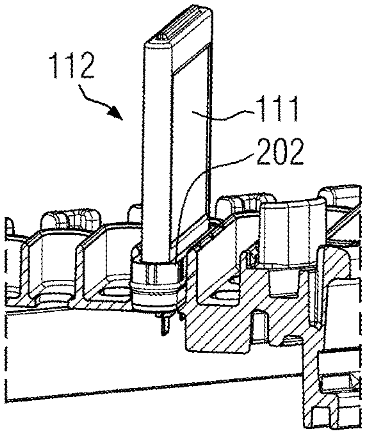
FIG. 6 shows a view of FIG. 4 or 5 after the joining process of the PTC heating device once the setting tool has been removed.

As can be seen from FIG. 4, the PTC heating device 112 is first inserted into the associated receptacle 116. The seal 119 is there pressed into the receptacle. Already this results in sufficient sealing of the PTC heating device 112 in the associated receptacle 116.

The setting tool 200 bears a press ring 202 at its front end. This press ring 202 is arranged at the front end of the chamber-shaped setting tool 200. The chamber of the setting tool 200 is configured such that it can basically completely accommodate the heating device 112 (cf. FIG. 5). A holder, not shown in detail, of the setting tool for releasably attaching the press ring 202 is provided with deformation projections 204 directly adjacent to the press ring 202 and in a direction opposite to the direction of insertion marked with E. When the setting tool 200 is slipped over the PTC heating device 112 together with the press ring 202, the press ring 202 is pushed, firstly, into the receptacle 116 and pressed in at the same time. Contact projections 206 provided on the press ring 202, extending in the direction of insertion E and protruding beyond the otherwise smooth outer circumferential surface of the press ring 202 claw into the inner wall of the receptacle 116. In the present case, the press ring 202 is made entirely of metal. It is in electrical contact with the housing upper part 104 due to the direct contact with the inner circumferential surface of the receptacle 116. However, it is also in contact with the outer circumferential surface of the heater casing 111 even after having been pressed into the receptacle 116. Electrical contact is established between the heater housing 111 and the upper housing part 102 by pressing in the press ring 202. The heater casing 111 is accordingly electrically integrated into the shielding of the housing upper part.

During the insertion motion of the setting tool 200, the deformation projections 204 are pressed against the front edge of the receptacle 116, which leads to a plastic deformation of the edges of the receptacle 116. As a result of this caulking, the material initially extending exclusively in the direction of insertion E and defining the receptacle 116 is also deformed radially inwardly and in the direction toward the heater casing 111. After the caulking process, parts of the partition wall 117 engage over the press ring 202 which is thereby secured in the receptacle 116 in a positive-fit manner.

Figure 7:
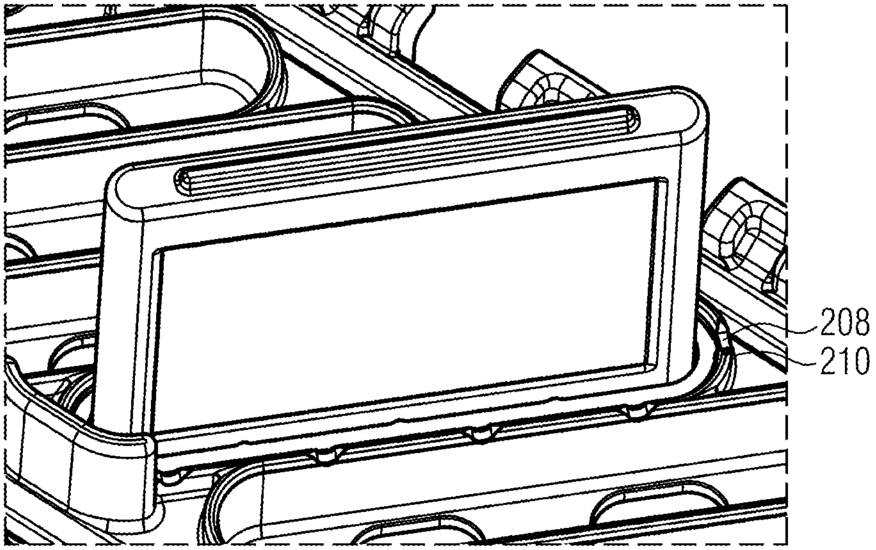
FIG. 7 shows a perspective side view of the PTC heating device after the caulking process.
Figure 8:
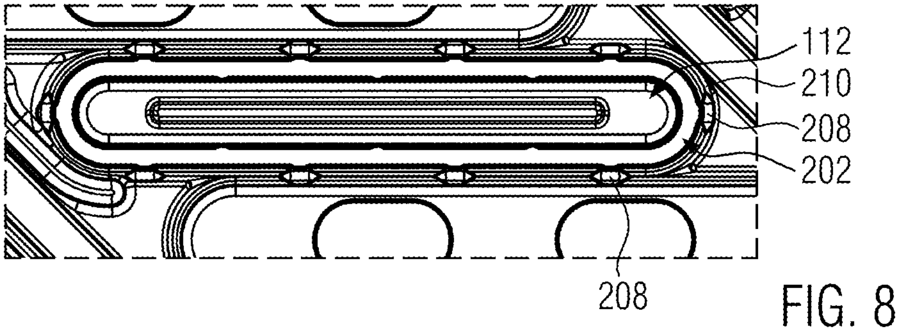
FIG. 8 shows a top view onto the PTC heating device after the caulking process.

The respective deformation regions are identified in FIGS. 7 and 8 as caulking deformations 208. The caulking deformation 208 is deformed in the direction of insertion E downwardly and also radially inwardly relative to the free edge of the receptacle 116, the edge being identified by reference numeral 210. As can be seen, adjacent receptacles 116 can share a common wall (cf. FIG. 6) so that several previously inserted press rings 202 are secured in a positive-fit manner in the associated receptacle 116 as described above when the edge 210 is caulked.

We claim:

1. An electric heating device comprising:

a housing having a partition wall which separates a connection chamber from a heating chamber for dissipating heat and from which at least one PTC heating element with a heater casing protrudes in a direction toward the heating chamber;

at least one PTC element and conductor tracks that are supported in the heater casing, the conductor tracks being electrically connected to the PTC element in the connection chamber and being configured to energize the PTC element with different polarities, wherein the conductor tracks and the at least one PTC element are connected in an electrically conductive manner and are supported in an insulated manner and the heater casing is sealed against the partition wall by way of a seal arranged in a receptacle of the partition wall circumferentially surrounding the heater casing; and a press ring that is arranged in the receptacle, that circumferentially surrounds the heater casing, and that secures the seal in the receptacle.

2. The electric heating device according to claim 1, wherein the PTC element and the conductor tracks are received in a shielded manner in the heater casing, and wherein the press ring is electrically conductive and electrically connects the heater casing to a ground terminal of the housing.

3. The electric heating device according to claim 1, wherein the press ring and the seal are realized in a unitary component.

4. The electric heating device according to claim 1, wherein the press ring is arranged between the seal and the heating chamber.

5. The electric heating device according to claim 1, wherein the press ring is secured in the receptacle by caulking the housing.

6. The electric heating device according to claim 1, wherein the press ring has several contact projections on an outer circumferential surface thereof that extend in a direction of insertion of the receptacle and that abut the receptacle, at least in part, under plastic deformation in the receptacle.

7. A method for producing an electric heating device, the heating device including a housing having a partition wall which separates a connection chamber from a heating chamber for dissipating heat and from which at least one PTC heating element with a heater casing protrudes toward the heating chamber, at least one PTC element and conductor tracks being supported in an insulated manner in the heater casing, the conductor tracks being electrically connected to the PTC element in the connection chamber and being configured to energize the PTC element with different polarities and being connected in an electrically conductive manner, the method comprising:

introducing the PTC heating device into a receptacle of the partition wall such that the PTC heating device protrudes from the partition wall in a direction toward the heating chamber; and introducing a press ring into the receptacle and securing the press ring in position in the receptacle.

8. The method according to claim 7, further comprising securing the press ring in position by caulking the housing.

* * * * *